UNITED STATES PATENT OFFICE.

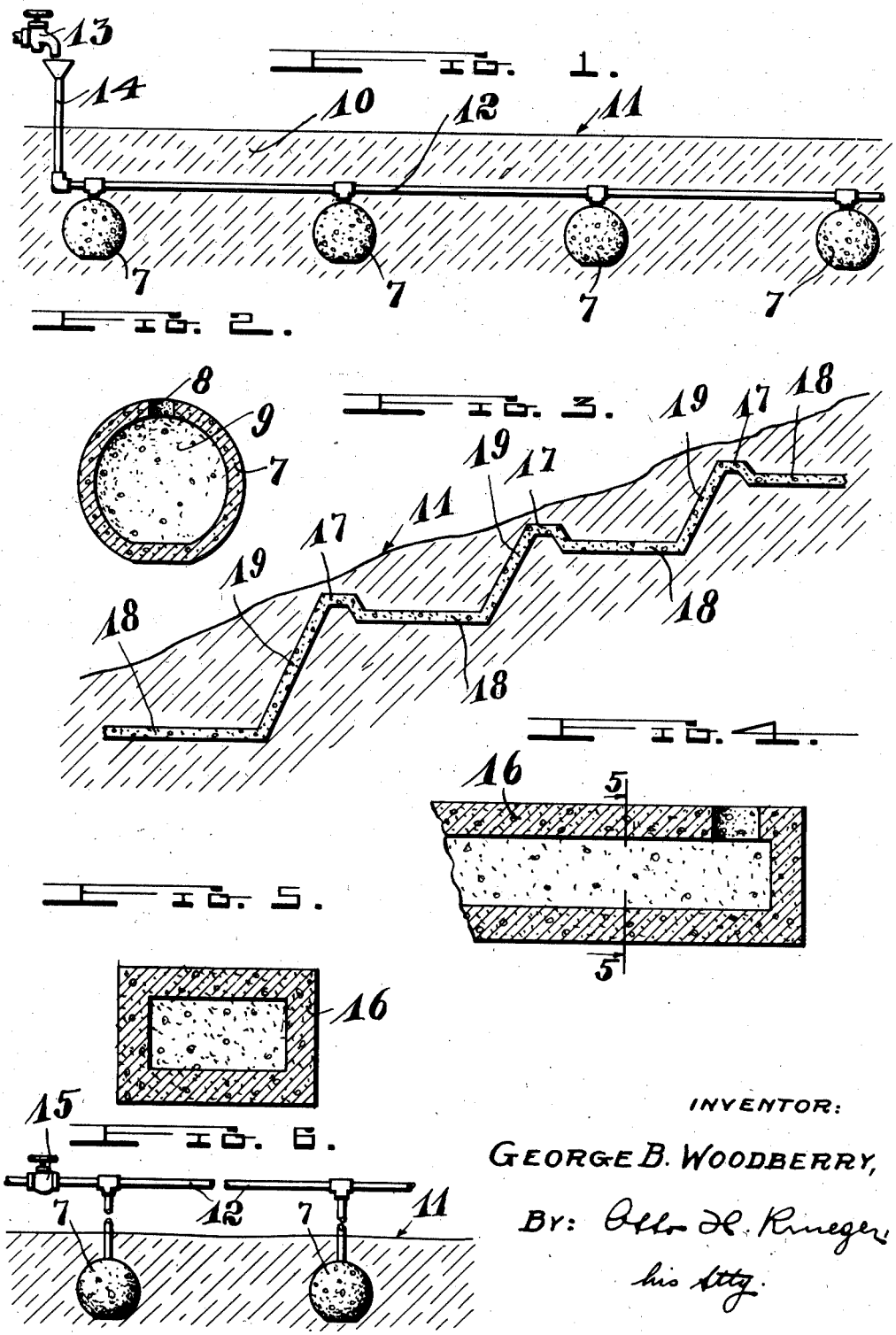

GEORGE B. WOODBERRY, OF GLENDALE, CALIFORNIA.

IRRIGATING SYSTEM AND METHOD OF APPLYING SAME.

1,401,386.   Specification of Letters Patent.   Patented Dec. 27, 1921.

Application filed February 21, 1921. Serial No. 446,590.

*To all whom it may concern:*

Be it known that I, GEORGE B. WOODBERRY, a citizen of the United States, residing at Glendale, in the county of Los Angeles and State of California, have invented a new and useful Irrigating System and Method of Applying Same, of which the following is a specification.

This invention relates to devices for distributing water for irrigating purposes.

One of the objects of this invention is to provide suitably porous water distributing means below the ground to be irrigated.

Another object is to practically percolate water into the ground.

Another object is to provide means for irrigating the soil evenly, no matter whether the top surface of the soil is hilly or level.

Another object is to provide means for evenly irrigating the soil, equally suitable for water acting by gravity or under pressure.

Another object is to provide means for evenly irrigating the soil, no matter whether the top surface of the soil is hilly or level, equally suitable for water acting by gravity or under pressure.

Other objects will appear from the following description and appended claims as well as from the accompanying drawing, in which—

Figure 1 is an illustration of parts in side elevation disposed largely in the soil.

Fig. 2 is a detail vertical cross sectional view of a percolating irrigating member.

Fig. 3 is an illustration of a slightly modified form of the irrigating system on a hill side.

Fig. 4 is a detail fragmentary longitudinal sectional view of the percolating member used in the modified form in Fig. 3.

Fig. 5 is a cross section through the member illustrated in Fig. 4 on line 5—5.

Fig. 6 is a side elevation of the system illustrated in Fig. 1, in slightly modified form.

It is common knowledge that irrigating from and through the top surface of the soil is very unsatisfactory. For one thing, the soil must first be prepared properly before any irrigation from the surface can be commenced at all, to be of any advantage. For another thing, it takes an enormous amount of water to irrigate from the surface down to the roots of plants, to which extent the water must descend into the soil before it becomes of any value to the plants. There are still many more reasons why irrigating from and through the top surface of the soil is not the best, a few of the most important may be cited as that the roots of plants actually develop and grow more closely to the surface, that is, in the direction from where the water comes, thereby impairing the rooting and anchoring facilities of plants; and that irrigating pipes placed on or near the surface are eventually clogged up when so improperly placed, by roots growing toward and around the pipes. Furthermore, the soil must be cultivated from time to time when irrigating from the top.

One of the main points, however, had in mind in using the system disclosed herein is that the means for transmitting the water to the soil must be of material porous to such an extent that the water transmitted through the transmitting means will leave entirely before any roots grow to such an extent as to interfere with the transmission of the water through this system.

Such transmitting means can be of many different forms and shapes without materially departing from the principle of this invention.

In Fig. 2, a section through a globe-like member is illustrated, while in Figs. 4 and 5 the member is of more rectangular cross section, both or either of these forms is used with similar results when arranged according to the illustrations in Figs. 1, 3 and 6.

Such members are preferably made of suitably porous concrete or mortar, so that water will percolate or seep through in all directions as soon as injected into the members. The material can naturally be so chosen that the water will pass out in a desired manner, coarse gravel mixed with poor lime or cement will naturally allow a quicker percolating and seepage than finer sand mixed with richer lime or cement.

Very porous members are preferably used in very sandy soil, while less porous members are used in richer soil with practically similar results as to the irrigating of the soil, as will easily be understood. As a general rule, however, the members are desired as porous as is possible without making the members too liable to break.

The globe-like member 7 is provided with the opening 8 to allow an insertion of a water connection, the central hollow space, indicated at 9, is proportioned according to the area to be irrigated by one member, the larger the area to be irrigated, the larger the hollow must be; a smaller area to be irrigated, naturally would only require a smaller hollow within the member 7.

In Fig. 1, a number of irrigating members 7 are disposed in the soil, indicated at 10, a suitable distance below the surface 11, so that any water passed into the members 7 normally percolates or seeps through the walls of the members 7 into the surrounding soil. Having the members made of coarse gravel, the water normally percolates and seeps out of the members absolutely, leaving the members dry enough that no roots of any plant are subjected to the tendency of growing toward these members as might otherwise be expected. Any number of members 7 can naturally be connected by a common supply pipe 12, and a faucet 13 can easily be arranged to keep the supply pipe 12 in a filled condition if so desired, or at least for periods found suitable with certain soil, the faucet 13 in Fig. 1 being shown to discharge into a funnel pipe 14. The supply pipe 12 can, however, be connected directly to a valve 15, as illustrated in Fig. 6.

While the arrangement illustrated in Fig. 1 allows only a steady flow and continuous filling of the irrigating members 7, the arrangement illustrated in Fig. 6 can naturally be so proportioned that the water will come in at such a rate that the members 7 can actually be kept under pressure, thereby allowing eventually a forcing of water into the soil from below the plants.

Such a forcing of water into the soil from below can also be used for loosening the soil.

In Fig. 1, the supply pipe 12 is illustrated as being below the surface with the irrigating or percolating members; while in Fig. 6, the supply pipe 12 is shown above the surface, such slight differences in the arrangements naturally not amounting to a departure from the principle of the invention.

The slightly modified form of irrigating and percolating member, illustrated in Figs. 3, 4 and 5, is used and operated in practically the same manner, eliminating the supply pipe 12 however, since the member 16 functions as a supply pipe and percolating member, the whole being made of porous material.

When used in a practically level soil, this slightly modified form is simply distributed and branched at suitable spaces through the whole soil and supplied with water for a suitable time to perform the act of irrigating for the particular soil, the members 16 being nothing but conduits.

On hilly or not quite level soil, a trap 17 is inserted ever so often so as to form a practically level percolating portion 18, the trap 17, and the overflow portion 19 in succeeding order in such a number as to cover the field or hill side.

The arrangement illustrated in Figs. 1 and 6 can naturally also be used on a hillside without necessitating any changes, since any water passed into the globe-like members cannot run out except by percolation through the walls of the members 7.

The percolating portions of the system, that is to say, the hollow globe-like members 7 in the illustrations 1 and 6 and also in a similar manner the practically horizontal portions 18 in the illustration of Fig. 3, form pocket-like portions in this system out of which the water cannot be drained after the water once settles in these pockets, since the percolating pockets are of such porous material as to prevent a forming of a siphon-like action in this system.

In the arrangements illustrated in Figs. 1 and 6, the water is transmitted to the pockets 7, and from there percolated into the soil, no matter whether the system is used on level or hilly ground.

In the arrangement illustrated in Fig. 3, the water is transmitted into the pockets 18, the trap portions 17 only allowing surplus water to pass over the next lower pockets, while not air and water tight enough to form a siphon-like action within the system.

Having thus described my invention, I claim:

1. In an irrigating system, a hollow globular member made of porous concrete having an aperture in the top to allow an insertion and securing of a supply pipe so that water may be forced into the porous body to percolate into the surrounding soil so as not to be retained in the body after the supply pipe is shut off.

2. In an irrigating system, hollow porous bodies having each a proportionately small aperture for securing and sealing supply connections disposed below the surface of soil, non-porous communicating pipes cemented into the apertures of the porous bodies, and water supplying means to bring water through the pipes into the sealed porous bodies.

3. In an irrigating system, a receptacle closed on all sides except for a proportionally small aperture in the top, the whole receptacle being made of porous concrete to warrant a percolation through the whole walls in all directions from the device, the aperture to receive a water supplying pipe.

4. In an irrigating system, the method of placing receptacles made entirely of porous material below the surface of soil, placing common connecting pipes from receptacle to receptacle with the ends inserted into the receptacles, injecting water through the connecting supplying pipes to fill the receptacles, shutting off the water at intervals, and normally keeping the receptacles dry and drained.

In testimony that I claim the foregoing as my invention I have signed my name in the presence of two subscribing witnesses.

GEORGE B. WOODBERRY.

Witnesses:
OTTO H. KRUEGER,
JESSIE A. MANOCK.